US010169687B2

(12) United States Patent
Miyagi et al.

(10) Patent No.: US 10,169,687 B2
(45) Date of Patent: Jan. 1, 2019

(54) PRINTING APPARATUS, PRINTING SYSTEM, AND PRINTING METHOD (71) Applicant: CANON KABUSHIKI KAISHA, Tokyo (JP)

(72) Inventors: Arata Miyagi, Kawasaki (JP); Nobuyuki Bannai, Machida (JP); Takeshi Suzuki, Inagi (JP); Akinori Horiuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/498,064

(22) Filed: Apr. 26, 2017

(65) Prior Publication Data
US 2017/0316289 A1 Nov. 2, 2017

(30) Foreign Application Priority Data

Apr. 28, 2016 (JP) ................. 2016-091440

(51) Int. Cl.
*H04N 1/04* (2006.01)
*G06K 15/02* (2006.01)
*G06F 3/12* (2006.01)
*G06K 15/00* (2006.01)

(52) U.S. Cl.
CPC ......... *G06K 15/021* (2013.01); *G06F 3/1205* (2013.01); *G06F 3/1206* (2013.01); *G06F 3/1208* (2013.01); *G06F 3/1243* (2013.01); *G06F 3/1244* (2013.01); *G06F 3/1255* (2013.01); *G06K 15/1822* (2013.01); *G06K 15/4065* (2013.01); *G06F 3/1228* (2013.01)

(58) Field of Classification Search
CPC ..... G06F 3/1205; G06F 3/1243; G06F 3/1255
USPC ....................................... 358/1.15
See application file for complete search history.

(56) References Cited

U.S. PATENT DOCUMENTS

2009/0284795 A1   11/2009   Torikoshi
2009/0303506 A1   12/2009   Ikegawa
2010/0309491 A1 *  12/2010   Yasui ................... G06F 3/1204
                                                        358/1.6

FOREIGN PATENT DOCUMENTS

JP   2004-110807 A   4/2004
JP   2008100366 A    5/2008

* cited by examiner

*Primary Examiner* — Houshang Safaipour
(74) *Attorney, Agent, or Firm* — Canon U.S.A., Inc. IP Division (57) ABSTRACT A printing apparatus determines whether or not predetermined processing in accordance with a predetermined shape of a medium is executed on an image of a printing target. In a case where it is determined that the predetermined processing is not executed on the image of the printing target, the printing apparatus executes the predetermined processing on the image of the printing target to perform printing. In a case where it is determined that the predetermined processing is executed on the image of the printing target, the printing apparatus prints the image of the printing target on which the predetermined processing is not executed.

15 Claims, 9 Drawing Sheets

PRINTING APPARATUS, PRINTING SYSTEM, AND PRINTING METHOD

BACKGROUND OF THE INVENTION

Field of the Invention

The present invention relates to a printing apparatus that can print an image of a printing target on a medium having a predetermined shape, a printing system, and a printing method.

Description of the Related Art

In recent years, a technology for printing a character and an image including an album title and a representative image on a label side of a disc medium such as a CD-R or a DVD-R has been proposed. For example, a user determines a layout of the label side by using application operating on a personal computer (PC), and the PC executes a driver of the printing apparatus, so that print data of the layout determined by the application is transmitted to the printing apparatus. The printing apparatus receives the print data to be printed on the disc medium.

When the printing is performed on the disc medium placed on a dedicated-use tray in the printing apparatus, a problem may occurs that the printing is performed on an area running out from the disc medium to contaminate the dedicated-use tray. To avoid this problem, Japanese Patent Laid-Open No. 2004-110807 describes a technology with which a part in an image of a printing target to be printed on the disc tray and a part that is not to be printed can be identified by a driver operating on a host computer.

Japanese Patent Laid-Open No. 2004-110807 describes a case where the host computer is provided with a function of creating an image for the disc medium (for example, a circular image having a white area in accordance with an inner diameter of the disc medium).

However, in some cases, the above-described image for the disc medium is not created in an information processing apparatus such as, for example, the host computer, and a rectangular image, for example, is transmitted to the printing apparatus. In this case, it is conceivable that the printing apparatus performs the printing on the area running out from the disc medium.

On the other hand, in some cases, the information processing apparatus that transmits the image can create the image for the disc medium. In this case, when processing of creating the image for the disc medium in the printing apparatus is to be regularly performed, a shape or the like of the image created by the information processing apparatus is changed by the above-described processing in the printing apparatus, and a printing result originally intended by the user is not attained in some cases.

SUMMARY OF THE INVENTION

The present invention has been made in view of the above-described circumstances and provides a technology with which it is possible to perform processing in accordance with a shape of a medium on an image of a printing target in an appropriate case.

A printing apparatus that can print an image of a printing target on a medium having a predetermined shape according to an aspect of the present invention includes a determination unit configured to determine whether or not predetermined processing in accordance with the predetermined shape is executed on the image of the printing target, an execution unit configured to execute the predetermined processing on the image of the printing target in a case where the determination unit determines that the predetermined processing is not executed on the image of the printing target, and a printing unit configured to print the image of the printing target on which the predetermined processing is executed by the execution unit on the medium having the predetermined shape, in which, in a case where the determination unit determines that the predetermined processing is executed on the image of the printing target, the printing unit prints the image of the printing target in which the determination unit determines that the predetermined processing is executed and also on which the predetermined processing is not executed by the execution unit.

Further features of the present invention will become apparent from the following description of exemplary embodiments with reference to the attached drawings.

DESCRIPTION OF THE EMBODIMENTS

Hereinafter, exemplary embodiments of the present invention will be described in detail for illustrative purposes with reference to the drawings. It should be noted however that relative arrangements of components, display screens, and the like described according to the exemplary embodiments are not intended to be limited to those.

First Exemplary Embodiment

Figure 1:
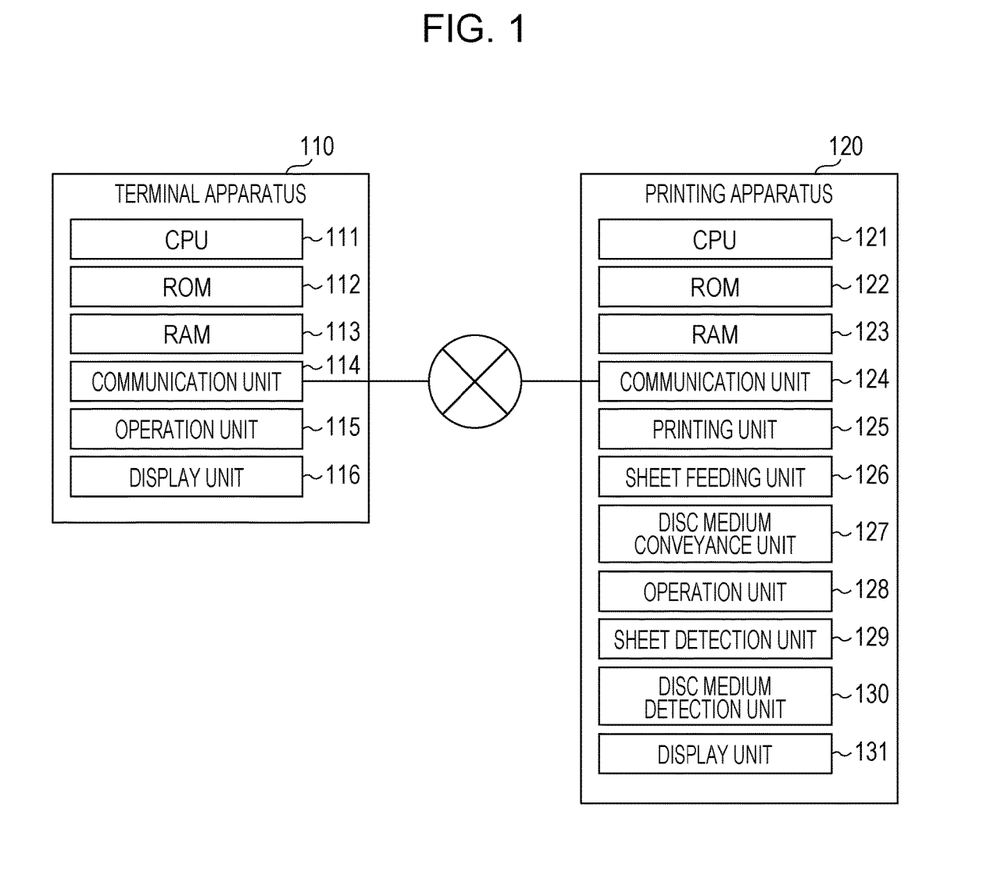
FIG. 1 illustrates a system configuration of a printing system.

FIG. 1 illustrates a system configuration of a printing system according to the present exemplary embodiment. The printing system according to the present exemplary embodiment is constituted by a terminal apparatus 110 corresponding to an example of an information processing apparatus configured to generate a print job and a printing apparatus 120 corresponding to an example of a printing apparatus configured to execute the print job.

The terminal apparatus 110 is provided with a CPU 111, a ROM 112, a RAM 113, a communication unit 114, an operation unit 115, and a display unit 116. The terminal apparatus 110 is, for example, a smart phone or a personal computer (PC). The operation unit 115 may be, for example, a key board or a mouse or may have a configuration integrated with the display unit 116 as a touch panel.

The CPU 111 develops programs stored in the ROM 112 into the RAM 113 to realize various functions that can be executed by the terminal apparatus 110. The programs include an operating system (OS) and printing application for performing printing. In addition, the programs may include a printer driver for causing the printing apparatus 120 to perform the printing, but the above-described OS may support a printing system provided as an OS standard utilizing a communication protocol with which the printing can be performed without using the driver of the printing apparatus. The communication protocol is, for example, Internet Printing Protocol (IPP) or Web Services on Devices (WSD). In the following explanation, an example will be described in which the terminal apparatus 110 generates and transmits the print job on the basis of the communication protocol provided as the OS standard without using the printer driver.

The CPU 111 includes setting information indicating various print settings in the printing executed by the printing apparatus 120 in the print job. The setting information is determined by the CPU 111 in accordance with contents instructed by way of operations performed by the user using the operation unit 115 on a screen displayed on the display unit 116 by the CPU 111. The print settings include settings with regard to the recording medium such as a size and a type of the recording medium on which the printing is performed, settings with regard to a color of the printing such as color/black-and-white, and settings with regard to a printing method such as one-side printing/duplex printing, and the like. It should be noted that the user can set whether the recording medium is a rectangular printing sheet or a disc medium on the basis of the setting of the size or the setting of the type of the above-described recording medium.

The thus generated print job is recorded in the RAM 113 and transmitted to the printing apparatus 120 connected via the communication unit 114. It should be noted that various configurations with regard to an interface (I/F) of the communication unit 114 and a connection mode can be applied to the present exemplary embodiment, and transmission and reception of data are performed by way of a wireless LAN, for example.

The printing apparatus 120 is provided with a CPU 121, a ROM 122, a RAM 123, a communication unit 124, a printing unit 125, a sheet feeding unit 126, a disc medium conveyance unit 127, an operation unit 128, a sheet detection unit 129, a disc medium detection unit 130, and a display unit 131.

The operation unit 128 may be provided, for example, with a key or may have a configuration integrated with the display unit 131 as a touch panel. The CPU 121 develops programs stored in the ROM 122 into the RAM 123, so that it is possible to realize various functions that can be executed by the printing apparatus 120. For example, the CPU 121 can execute the print job received by the communication unit 124.

The printing unit 125 is, for example, a printing unit of an inkjet method. While the printing unit 125 ejects ink from a recording head, it is possible to perform the printing on the printing sheet or a label side of the disc medium.

The execution of the print job refers to processing in which print data is created on the basis of image data included in the print job, and the printing unit 125 performs the printing on a recording sheet or the disc medium conveyed by the sheet feeding unit 126 or the disc medium conveyance unit 127.

The above-described setting information included in the print job is obtained while the CPU 121 analyzes the print job received via the communication unit 124 in accordance with an analysis program stored in the ROM 122. The CPU 121 determines the medium on which the printing is performed in accordance with the print settings identified by the thus obtained setting information and causes one of the sheet feeding unit 126 and the disc medium conveyance unit 127 to convey the recording medium. Then, the CPU 121 causes the printing unit 125 to execute the print processing. At this time, the CPU 121 determines whether or not the sheet exists in the sheet feeding unit 126 by using the sheet detection unit 129. In a case where the CPU 121 determines that the sheet does not exist, the CPU 121 causes the display unit 131 to display that effect so that it is possible to prompt the user to set the sheet. Alternatively, the CPU 121 determines whether or not the disc medium exists in the disc medium conveyance unit 127 by using the disc medium detection unit 130. In a case where the disc medium does not exist, the CPU 121 causes the display unit 131 to display that effect so that it is possible to prompt the user to set the disc medium.

In both a case where the printing is performed on the sheet and a case where the printing is performed on the disc medium, after the user sets the sheet or the disc medium, the user can instruct continuation of the printing by using the operation unit 128. In addition, the user can set sheet information in the sheet feeding unit 126 in advance by using the operation unit 128 and the display unit 131. The sheet information includes a size of the sheet such as A4 or L-type and a type of the sheet such as a plain paper, glossy paper, or mat pater. The sheet information set by the user in the above-described manner is stored in the RAM 123. In addition, the user can set whether the disc medium printing by the printing apparatus 120 is permitted or prohibited by using the operation unit 128 and the display unit 131. The setting of permission/prohibition of the disc medium printing which has been set as described above is stored in the RAM 123.

It should be noted that the printing apparatus 120 and the terminal apparatus 110 are provided with a remote UI function, and the user can also perform the setting of the sheet information or the permission/prohibition of the disc medium printing by using a remote UI displayed by the terminal apparatus 110 instead of the operation unit 128 and the display unit 131. The setting by using the remote UI will be described below with reference to FIG. 2 and FIG. 3.

As described above, the sheet detection unit 129 and the disc medium detection unit 130 can determine the presence or absence of the sheet or the disc medium. As a method for the determination, for example, the presence or absence of the sheet or the disc medium is checked by a sensor. In this case, for example, the following configuration is adopted. The sensor is provided with a light emitting unit and a light receiving unit. Then, in a state in which the sheet or the disc medium does not exist, light emitted from the light emitting unit is received by the light receiving unit. When the sheet or the disc medium is set, the light is interrupted by the sheet or the disc medium, and the light is not received by the light receiving unit. As a result, the presence or absence of the sheet or the disc medium can be determined depending on whether or not the light receiving unit receives the light. The configuration of the sensor is not limited to this. For example, a movable protrusion may be provided on a plane where the sheet or the disc medium is set, and whether or not the protrusion protrudes from the plane may be detected by the sensor. That is, in a case where the sheet or the disc medium is not set, a state is established in which the protrusion protrudes from the plane, and when the sheet or the disc medium is set, a state is established in which the protrusion does not protrude from the plane. For this reason, the presence or absence of the sheet or the disc medium can be determined by using the above-described sensor.

In addition, with regard to the disc medium, when a detachable dedicated-use try is set in the printing apparatus 120 and the dedicated-use try is mounted to the printing apparatus 120, the disc medium detection unit 130 may convey the dedicated-use try. In this case, the disc medium detection unit 130 may regard a result of the determination on the presence or absence of the dedicated-use try as the presence or absence of the disc medium.

With the printing system illustrated above in FIG. 1, the image of the printing target transmitted from the terminal apparatus 110 to the printing apparatus 120 is printed on the disc medium. It should be noted however that, in a case where the terminal apparatus 110 uses the printing method provided as the OS standard without using the printer driver as described above, the processing specialized to the printing apparatus which can be performed on the basis of the printing method using the printer driver is not performed in some cases. The processing specialized to the printing apparatus includes, for example, processing of executing white mask processing on image data in accordance with sizes of an inner diameter and an outer diameter of the disc medium in advance to be transmitted to the printing apparatus. The white mask processing refers to processing of rewriting a pixel value in part of an area in the image into a pixel value equivalent to white. Specifically, a value of a pixel in an area running out from the shape of the disc medium in the image is rewritten to the value equivalent to white. Since the printing apparatus 120 does not perform the printing on the pixel having the value equivalent to white, the printing is not performed in an area other than an area having a shape in accordance with the shape of the disc medium in the image. It should be noted that the pixel value after the mask processing is not limited to the pixel value equivalent to white, and it is sufficient when a predetermined pixel value indicating that the printing apparatus 120 does not perform the printing is used. As the predetermined pixel value, for example, Null data may be written, or a minus value may also be written. In addition, as the pixel value, an RGB luminance value may be written, or a CMYK density value may also be written.

As described above, in a case where the terminal apparatus 110 does not perform the white mask processing without using the printer driver, the terminal apparatus 110 is to utilize a square sheet having a sheet size of "12 cm×12 cm" as the sheet size. A reason why the sheet size is limited to "12 cm×12 cm" is that the printing application of the terminal apparatus 110 transmits the image having the set sheet size, and the printing apparatus 120 performs same-size printing in the printing system according to the present exemplary embodiment. That is, if the sheet size in the print setting is set as a size substantially larger than "12 cm×12 cm", only a small portion of the image is printed. On the other hand, if the sheet size in the print setting is set as a size substantially smaller than "12 cm×12 cm", only a small portion of the disc medium is printed. For this reason, the printing apparatus 120 performs the printing on the disc medium only when "12 cm×12 cm" corresponding to the size close to the size of the disc medium is set in the print setting.

However, in this case, the data of the square having the sheet size "12 cm×12 cm" is transmitted to the printing apparatus 120, and the ink may be ejected while running out from the circular disc, which contaminates the disc tray with the ink in some cases.

In view of the above, according to the present exemplary embodiment, the printing apparatus 120 performs processing of creating an image for the disc medium (for example, white mask processing). As a result, even when the data of the square having the sheet size "12 cm×12 cm" is transmitted, the printing apparatus 120 can perform the printing in accordance with the shape of the disc medium. The printing apparatus 120 also determines whether or not the processing of creating the image for the disc medium (for example, the white mask processing) is already executed in the terminal apparatus 110 and performs control such that the above-described processing is not redundantly performed in the terminal apparatus 110 and the printing apparatus 120. As a result, it is possible to avoid a situation where the shape or the like of the image created by the terminal apparatus 110 is changed by the above-described processing in the printing apparatus and a print result originally intended by the user is not obtained. Hereinafter, the processing according to the present exemplary embodiment will be described in detail.

Figure 2:
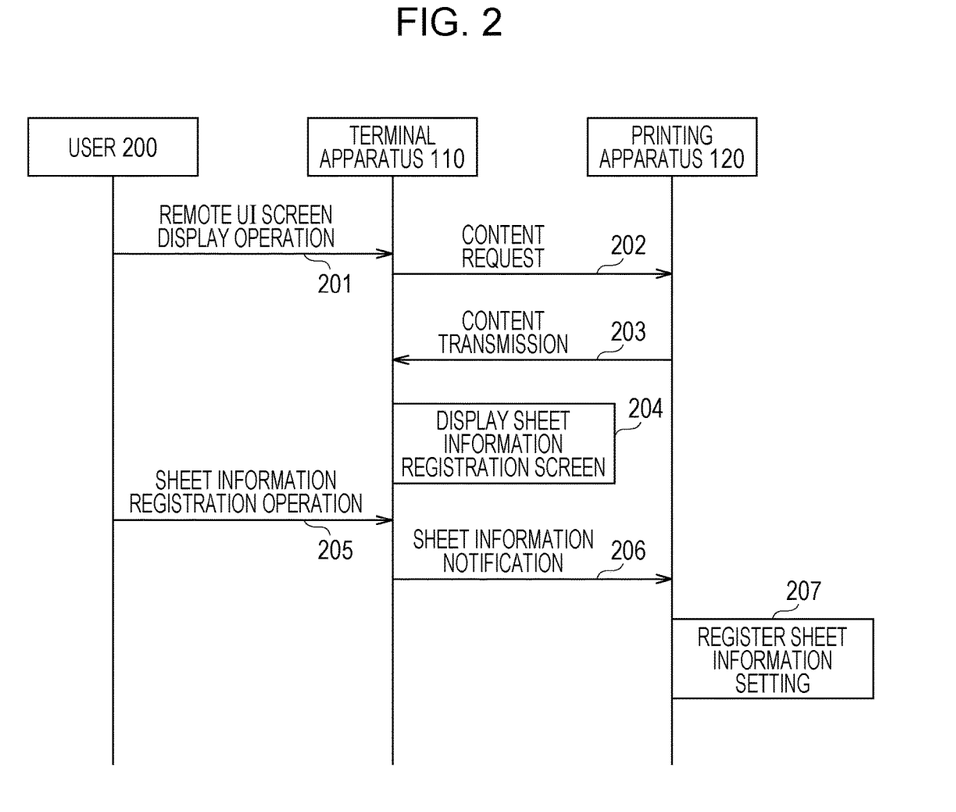
FIG. 2 is a sequence diagram illustrating registration processing of sheet information.

FIG. 2 is a sequence diagram illustrating registration processing of sheet information. It should be noted that, in FIG. 2, the user 200 performs various operations by operating the operation unit 115, and the terminal apparatus 110 performs various processings while the CPU 111 executes the printing application in the ROM 112. In addition, the printing apparatus 120 performs various processings while the CPU 121 executes a control program in the ROM 122.

The user 200 performs remote UI screen display operation for displaying a screen of the remote UI on the display unit 116 of the terminal apparatus 110 by using the operation unit 115 (step 201). According to the present exemplary embodiment, the CPU 111 of the terminal apparatus 110 activates browser application stored in the ROM 112, so that the remote UI screen can be displayed. In response to an operation of the remote UI screen display operation 201, the CPU 111 of the terminal apparatus 110 requests the printing apparatus 120 for contents constituting the remote UI screen (step 202). In response to the content request in step 202, the CPU 121 of the printing apparatus 120 transmits the contents stored in the ROM 122 or the RAM 123 to the terminal apparatus 110 (step 203). The CPU 111 of the terminal apparatus 110 displays the contents transmitted in step 203 by using the browser. As a result, a registration screen as a remote UI screen for registering the sheet information of the printing apparatus 120 (the size of the sheet and the type of the sheet) is displayed on the display unit 116 (step 204).

Figure 3:
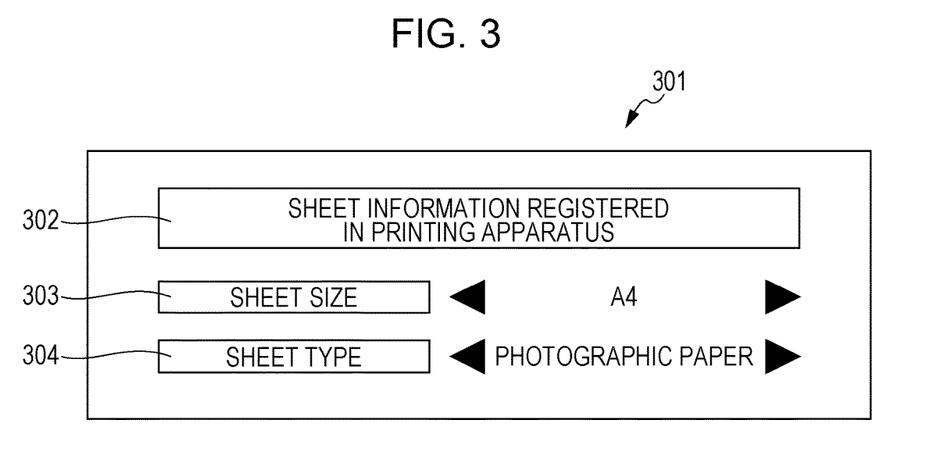
FIG. 3 illustrates a registration screen as a remote user interface (UI) screen.

FIG. 3 illustrates the registration screen as the remote UI screen displayed in step 204. A sheet information registration screen 301 is displayed on the display unit 116 of the terminal apparatus 110. A screen title 302 indicates that the sheet information is to be registered, and the user 200 performs the registration operation for registering the sheet size 303 and the sheet type 304 as the sheet information. For example, in a case where the operation unit 115 is a touch panel, the sheet size and the sheet type can be respectively changed by touching arrows displayed on the right and left sides of "A4" and "photographic paper" in FIG. 3. Then, when an OK button which is not illustrated in the drawing is touched, the sheet size and the sheet type displayed on the sheet information registration screen 301 are registered. In the example of FIG. 3, A4 is registered as the sheet size, and the photographic paper is registered as the sheet type.

As described with reference to FIG. 3, the user 200 performs registration operation for registering the sheet information of the sheet set in the printing apparatus while checking the screen displayed in step 204 (step 205). The CPU 111 notifies the printing apparatus 120 of the sheet information registered in step 205 (step 206). Then, the CPU 121 stores the sheet information notified of in step 206 in the RAM 123 to register the sheet information (step 207).

With the processing illustrated in FIG. 2, even if the printing apparatus 120 is not provided with the operation unit and the display unit, the user 200 can register the sheet information of the printing apparatus 120 by utilizing the operation unit 115 of the terminal apparatus 110. In addition, similarly, the user 200 can set whether or not the printing apparatus 120 permits the disc medium printing by using the remote UI which is not illustrated in the drawing.

Figure 4:
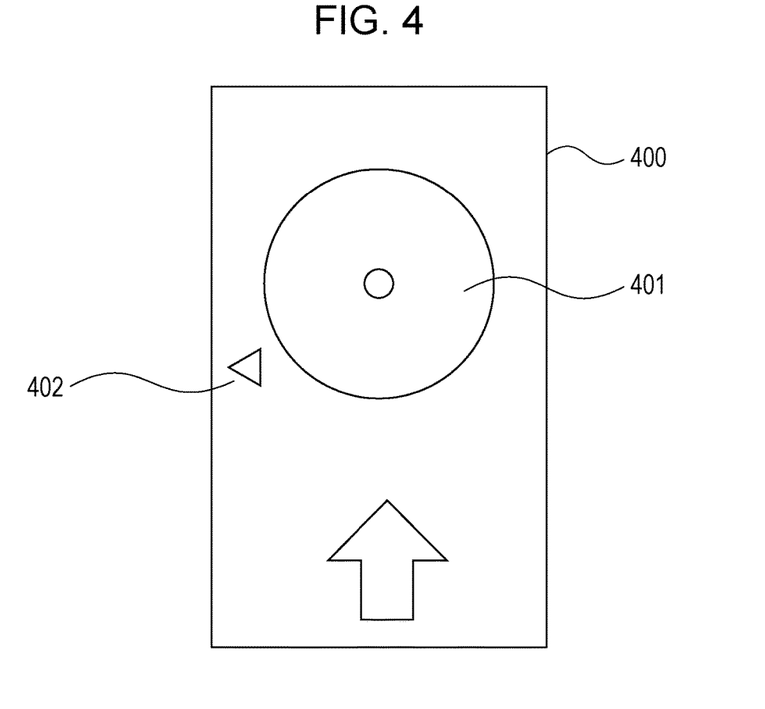
FIG. 4 illustrates an outer appearance of a disc medium tray.

FIG. 4 illustrates an outer appearance of a disc medium tray corresponding to a dedicated-use tray utilized when the printing apparatus 120 performs the disc medium printing. The user sets the disc medium on which the printing is performed on a disc medium setting position 401 on a disc medium tray 400. Then, the disc medium tray 400 is inserted into the disc medium conveyance unit 127 while a registration mark 402 is matched with a registration mark that is not illustrated in the drawing of the printing apparatus 120. Then, when the printing apparatus 120 receives the print job for designating the printing on the disc medium, the disc medium conveyance unit 127 conveys the disc medium tray, and the printing unit 125 performs the printing. It should be noted that a configuration may be adopted in which a mechanism where the disc medium can be directly set in the printing apparatus 120 is provided, and the disc medium is conveyed without using the disc medium tray 400.

Figure 5:
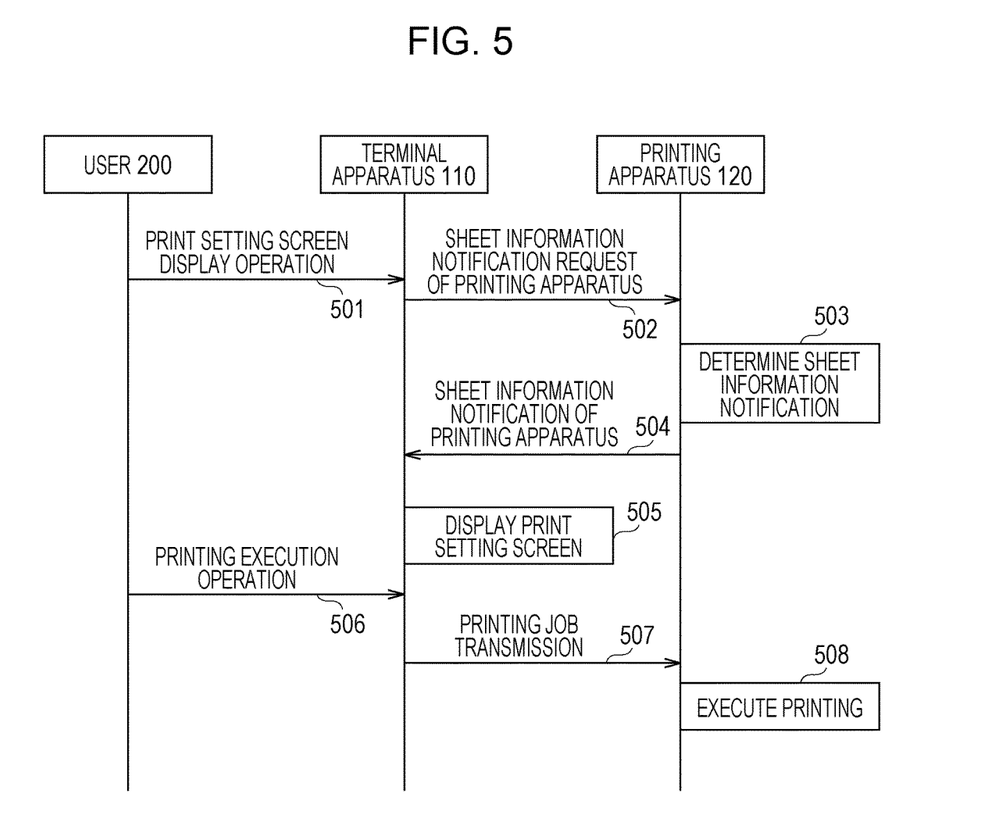
FIG. 5 is a printing sequence diagram of the printing system.

FIG. 5 is a printing sequence diagram of the printing system according to the present exemplary embodiment. It should be noted that, in FIG. 5, the user 200 performs the various operations by operating the operation unit 115, and the terminal apparatus 110 performs the various processings while the CPU 111 executes the above-described printing application in the ROM 112. In addition, the printing apparatus 120 performs the various processings while the CPU 121 executes the control program in the ROM 122. It should be noted that the terminal apparatus 110 that sets the sheet information by using the remote UI in FIG. 2 and the terminal apparatus 110 that generates the print job in FIG. 5 may be different terminal apparatuses.

The user 200 performs an operation for displaying a screen for performing the print setting with respect to the terminal apparatus 110 (step 501). At this time, the CPU 111 of the terminal apparatus 110 requests notification of the sheet information registered in the printing apparatus 120 with respect to the printing apparatus 120 (step 502). When the CPU 121 of the printing apparatus 120 receives the notification request of the sheet information in step 502, the sheet detection unit 129 determines the notification contents of the sheet information on the basis of the detection result of the disc medium detection unit 130 (step 503). Specifically, for example, in a case where the sheet detection unit 129 detects that the sheet is set, the CPU 121 determines the sheet information (the sheet size and the sheet type) registered in step 207 of FIG. 2 as the notification contents. When the disc medium detection unit 130 detects that the disc medium (or the disc medium tray 400) is set, the CPU 121 determines disc medium information for notifying that the disc medium is set as the sheet information. In addition, there are cases where it is detected that both the disc medium and the sheet are set since the disc medium and the sheet can be set in the printing apparatus 120 at the same time. In this case, the CPU 121 determines both the registered sheet information and the disc medium information for notifying that the disc medium is set as the sheet information.

The CPU 121 performs notification of the sheet information determined as a result of the processing in step 503 (step 504). The CPU 111 of the terminal apparatus 110 performs display of a print setting screen by utilizing the sheet information notified of in step 504 (step 505). A detail of the display of the print setting screen in step 505 will be described below with reference to FIG. 9.

The user 200 performs the print setting in accordance with the print setting screen displayed in step 505 and also performs a printing execution operation (step 506). Then, the CPU 111 of the terminal apparatus 110 creates a print job in accordance with the printing execution operation and transmits the print job towards the printing apparatus 120 (step 507). When the print job from the terminal apparatus 110 is received, the CPU 121 of the printing apparatus 120 executes the printing in accordance with the contents of the print job (step 508).

Figure 9:
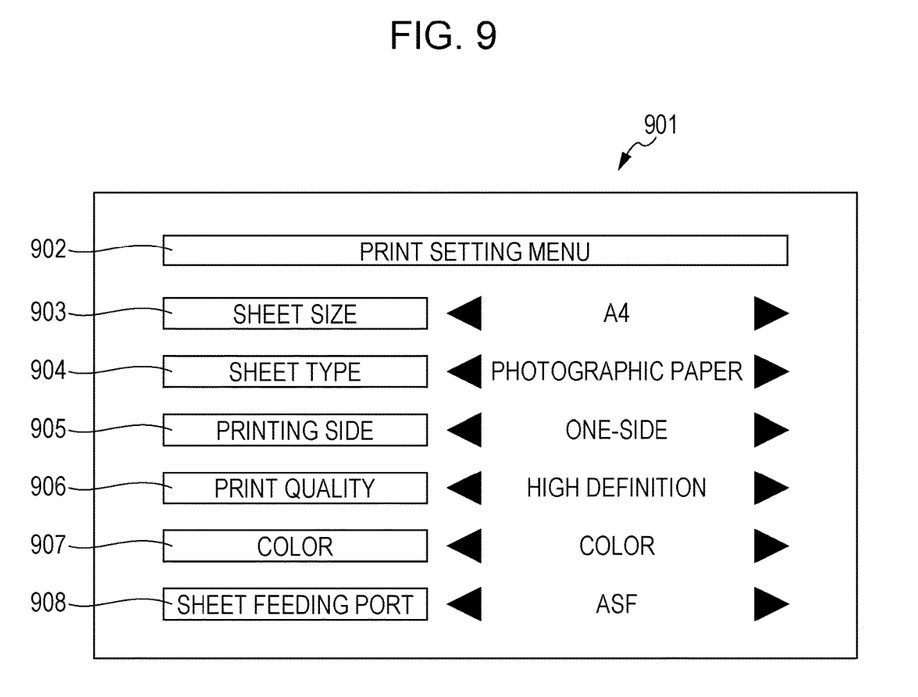
FIG. 9 illustrates an example of a print setting screen.

Here, the display of the print setting screen in step 505 will be described. FIG. 9 illustrates an example of the print setting screen displayed in step 505 of FIG. 5.

The print setting screen 901 is displayed on the display unit 116 of the terminal apparatus 110. A title 902 indicates that the screen corresponds to the print setting menu, and item names 903 to 908 indicate items that can be set by the print setting screen 901. With respect to each of the items, the user 200 can select a desired setting by using the operation unit 115. The user can select a sheet size such as "A4", "4×6", or "12 cm×12 cm" as a sheet size 903. A sheet type such as "plain paper", "photographic paper", or "disc" can be selected as a sheet type 904. It should be noted that "disc" indicates that the sheet type is the disc medium.

A printing side such as "one-side" or "duplex" is selected as a printing side 905 for the printing. A printing quality 906 indicates a finish of the printing, a printing quality such as "standard" or "high definition" is selected. A color 907 indicates a color for the printing, and a color such as "color" or "black-and-white" is selected. A sheet feeding port 908 indicates a sheet feeding section where sheet feeding is performed, and "ASF", "disc", or the like is selected. It should be noted that the "ASF" corresponds to the sheet feeding unit 126 and indicates an auto sheet feeder (not illustrated) arranged on a back surface of the printing apparatus 120, for example. The "disc" indicates the disc medium conveyance unit 127.

In step 505, the CPU 111 narrows down the setting contents that can be selected by the user in accordance with the sheet information notified of in step 504 of FIG. 5 and displays the print setting screen illustrated in FIG. 9. For example, in the determination on the notification contents of the sheet information (step 503), it is determined that the notification of the sheet information registered in step 207 of FIG. 2 is to be performed. In the example of FIG. 3, the sheet size is set as "A4" and the sheet type is set as "photographic paper" to be registered in the printing apparatus 120. For this reason, in step 505, the CPU 111 displays "A4" and "auto" as the sheet size, "photographic paper" and "auto" as the sheet type, and "ASF" and "auto" as the sheet feeding port on the print setting screen such that the setting items can be selected. It should be noted that "auto" refers to the setting for performing the printing in accordance with the sheet size and the sheet type registered in the printing apparatus 120 and also the sheet feeding port. As a result, at the time of the printing, even when the sheet size and the sheet type are changed from the contents notified of in step 504, the printing can be performed in accordance with the sheet size and the sheet type after the change. In addition, when the sheet type is "disc" as the sheet feeding port, "disc" is set, and when the sheet type is not "disc", "ASF" is set.

On the other hand, in a case where it is determined that the disc medium is set in the printing apparatus 120 and the notification of the disc medium information is to be performed, "12 cm×12 cm" is displayed as the sheet size, "disc" is displayed as the sheet type, and "disc" is displayed as the sheet feeding port. For example, the notification of the sheet information and the disc medium information registered in the printing apparatus 120 is performed, in addition to the above-described options, "12 cm×12 cm" is added as the option for the sheet size, "disc" is added as the option for the sheet type, and "disc" is added as the option for the sheet feeding port.

It should be noted that the contents that can be selected in the print setting items 903 to 908 and the respective print setting items are not limited to the above-described contents. For example, in a case where the printing apparatus 120 does not cope with the duplex printing, the printing side 905 only copes with "one-side". Therefore, a configuration may be adopted in which the printing side 905 is not displayed, or only "one-side" can be selected. In this case, information on whether or not the printing apparatus 120 copes with the duplex printing is included in the notification in step 504. For this reason, the CPU 111 of the terminal apparatus 110 can determine whether or not the printing apparatus 120 copes with the duplex printing. Similarly, with regard to the respective items including the printing quality 906, the color 907, and the sheet feeding port 908 too, the information indicating the options that can be executed in the printing apparatus 120 may be included in the notification in step 504. In this case, only the options that can be realized in the printing apparatus 120 are displayed among the respective setting items of the print setting screen 901.

In addition, as the above-described setting in a case where "auto" is selected, a predetermined setting in the printing application of the terminal apparatus 110 may be performed, or a predetermined setting in the printing apparatus 120 may be performed. The contents and the display layout displayed on the print setting screen 901 are also not limited to the examples illustrated in FIG. 9. The title 902 in the print setting menu may be omitted, for example.

It should be noted that the print setting screen 901 may be displayed by the printing application of the terminal apparatus 110. For example, when the printing target is a simple photograph in simple application, in a case where the printing side 905 is fixed to "one-side", the printing quality 906 is fixed to "standard", and the color 907 is fixed to "color", the display may be omitted. In this case, the operation of the user 200 can be simplified. In addition, since the sheet size 903 and the sheet type 904 among the print setting items on the print setting screen 901 illustrated in FIG. 9 are uniquely determined from the sheet information obtained by the terminal apparatus 110, the display may be omitted.

In addition, according to the present exemplary embodiment, the notification of the sheet information from the printing apparatus 120 is executed in step 504 of FIG. 5, but a timing for performing the notification of the sheet information between the printing apparatus 120 and the terminal apparatus 110 is not particularly specified. For example, the notification of the sheet information may be executed when the communication unit 114 of the terminal apparatus 110 and the communication unit 124 of the printing apparatus 120 are connected to each other as the printing system.

Herein, the transmission of the print job in step 507 and the printing execution in step 508 of FIG. 5 will be described. The print job includes the setting information indicating the print settings such as the sheet size and the sheet type as described above.

It should be noted that, according to the present exemplary embodiment, the printing apparatus 120 prints the image area that is part of the image included in the print job received from the terminal apparatus 110 and that also has the shape corresponding to the shape of the disc medium for the printing on the disc medium. In addition, as the condition for performing the printing on the disc medium, when the sheet size is set as "12 cm×12 cm" and also the sheet type is set as "disc", the printing apparatus 120 causes the disc medium conveyance unit 127 to perform the conveyance and causes the printing unit 125 to perform the printing.

It should be noted however that the printing on the disc medium may also be performed when the sheet size in the print setting is "auto". In a case where the printing apparatus 120 performs the printing while an automatic automatic magnification/reduction is carried out, the printing on the disc medium may be performed when the sheet type is "disc" without taking into account the sheet size in the print setting.

In addition, when the printing on the disc medium is performed, the printing apparatus 120 performs the printing by using a printing profile of a regular disc medium in a case where the printing quality 906 is "standard" and performs the printing by using a printing profile of a recommended product disc medium in a case where the printing quality 906 is a "high definition". The printing profile of the recommended product disc medium refers to a printing profile adjusted for a commercially available recommended disc medium appropriate to the printing, and a high definition print result can be obtained by combination with the commercially available recommended disc medium appropriate to the printing. The printing profile of the regular disc medium is adjusted to the commercially available general disc medium for printing, and ink bleed hardly occurs even when an ink receptive capacity of the disc medium is low.

As described above, the printing apparatus 120 according to the present exemplary embodiment can print only the disc medium area having the shape corresponding to the shape of the disc medium in the image received from the terminal apparatus 110. Thus, when the terminal apparatus 110 is not provided with a function of creating an image for the printing on the disc medium, and even if a rectangular image is transmitted, for example, only the above-described disc medium area is printed in the printing apparatus 120. For this reason, it is possible to avoid the printing that runs out from the disc medium. Thus, for example, it is possible to avoid the contamination the disc medium tray 400 with ink while the printing that runs out from the disc medium is performed.

However, for example, it is assumed that the terminal apparatus 110 is provided with the function of creating the image for the printing on the disc medium. Then, it is assumed that an inner diameter and an outer diameter can be adjusted by an operation by the user in accordance with a shape of a label side of the disc medium (side where a recording material such as ink is absorbed) as the shape of the disc medium, for example. In this case, the disc medium area adjusted by the user in the terminal apparatus 110 may be different from the supposed disc medium in the printing apparatus 120. In the above-described case, the area supposed by the user and the actually printed area may be different from each other as a result of the print processing of the disc medium area in the printing apparatus 120.

In view of the above, in the printing system according to the present exemplary embodiment, information indicating whether or not the processing is performed in accordance with the disc medium with respect to the image by the terminal apparatus 110 is added to the print job. Then, in a case where it is determined that the processing in accordance with the disc medium with respect to the image is not performed by the terminal apparatus 110 on the basis of the above-described information, the printing apparatus 120 performs the printing by carrying out predetermined processing for printing only the disc medium area. On the other hand, in a case where it is determined that the processing in accordance with the disc medium with respect to the image is performed by the terminal apparatus 110, the printing is performed without carrying out the above-described predetermined processing.

According to the present exemplary embodiment, the white mask processing is performed as the creation processing for the image in accordance with the shape of the disc medium.

Figure 8:
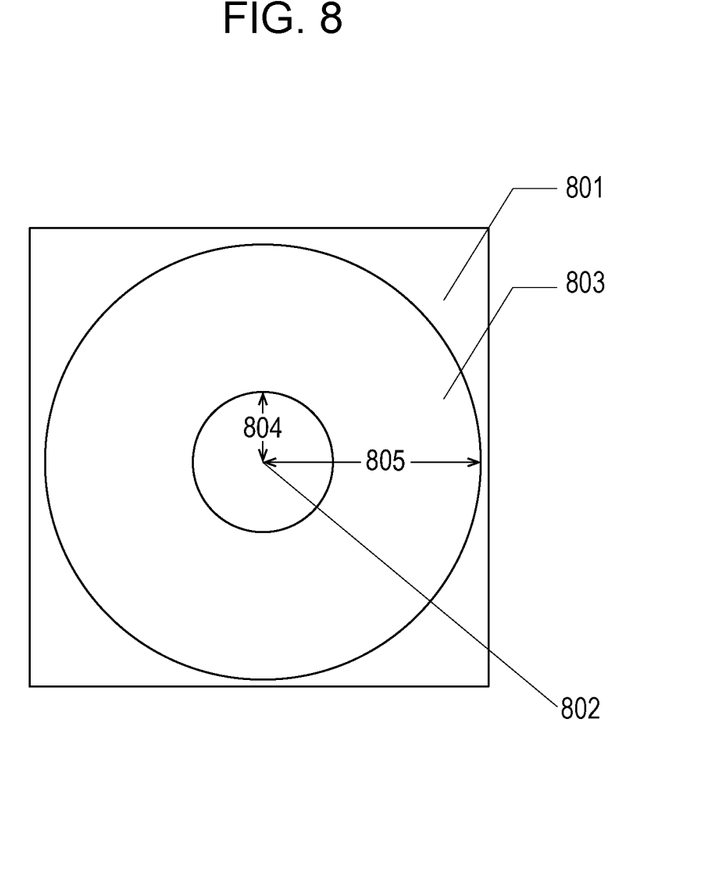
FIG. 8 is an explanatory diagram for describing the white mask processing.

FIG. 8 is an explanatory diagram for describing the white mask processing according to the present exemplary embodiment.

An area 801 corresponds to a printing image of a printing target and image data of a square of 12 cm×12 cm. An area 803 corresponds to the disc label side that is the printing area of the disc medium. The area 803 is an area sandwiched by a small circle of an inner radius 804 and a large circle of an outer radius 805 which are concentric circles. The area 801 and the inner radius 804 except for the area 803 are out of printable areas and are areas of targets of the white mask. Herein, the inner radius 804 and the outer radius 805 can be adjusted by the operation by the user. For example, in a case where disc label sides of various sizes exist in the disc media of the same size, adjustment can be performed in accordance with the size of the disc label side of the disc medium on which the printing is performed. When the white mask processing is executed, values of pixels included in the area 801 and the area 802 are replaced by the value equivalent to white.

Figure 6A:
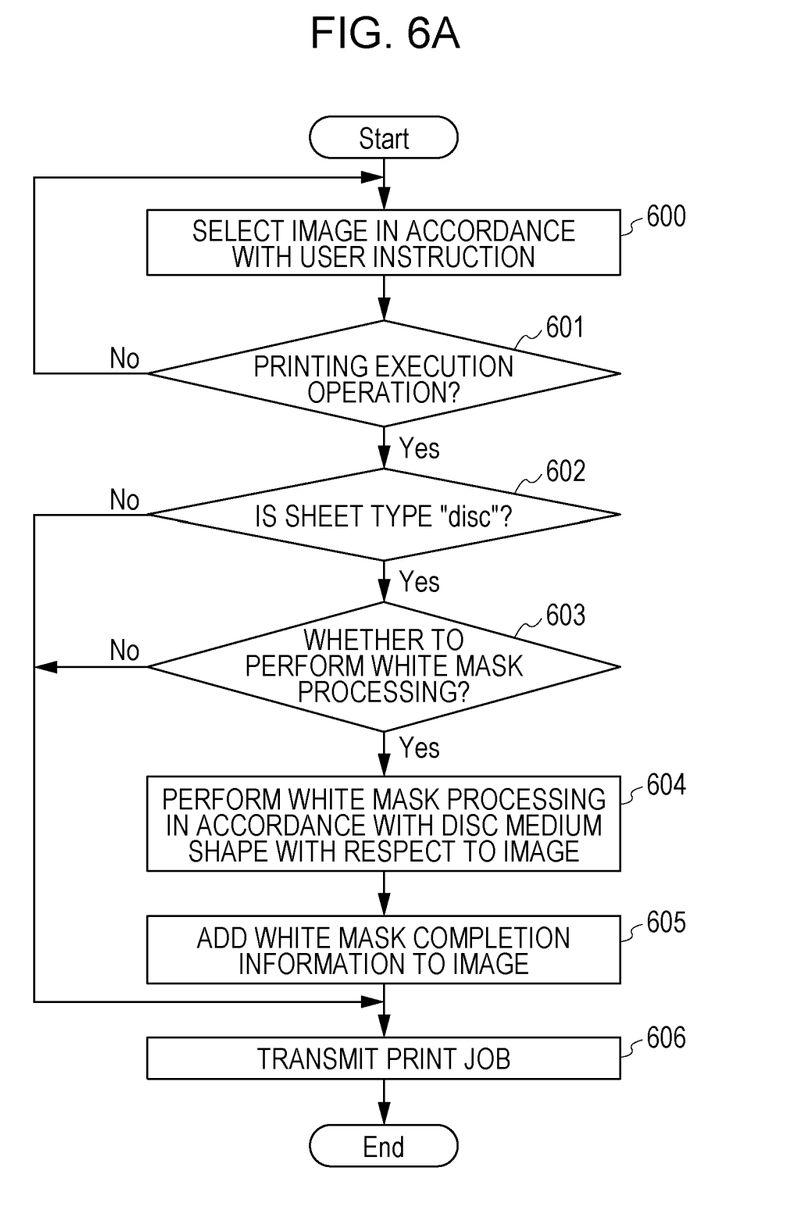
FIGS. 6A and 6B are flow charts of disc medium printing in the printing system.
Figure 6B:
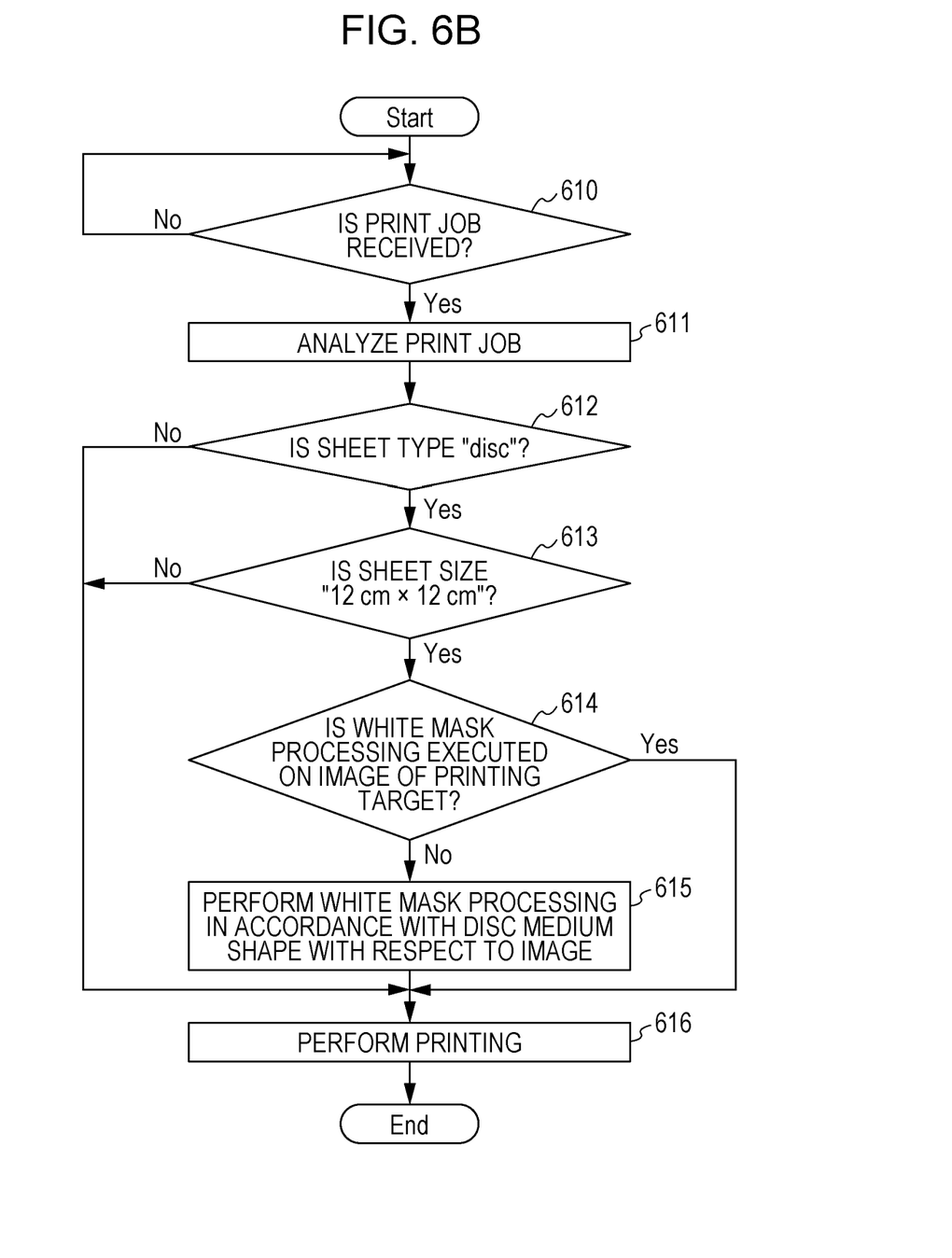

FIGS. 6A and 6B are flow charts of the disc medium printing in the printing system. FIG. 6A illustrates the processing in the terminal apparatus 110. The processing corresponds to step 506 and step 507 of FIG. 5 and is realized while the CPU 111 executes the printing application in the ROM. It should be noted that the printing application that executes the processing of FIG. 6A is provided with the function of creating the image in accordance with the shape of the disc medium.

In step 600, the CPU 111 selects an image (such as a JPEG file) by using the function of the printing application in accordance with the instruction of the user 200. In this selection processing, for example, the CPU 111 displays thumbnail images of image files in the terminal apparatus 110 on the display unit 116 and selects the image file corresponding to the thumbnail image selected in accordance with the operation by the user with respect to the operation unit 115. In addition, in step 600, various editing processings such as addition of a text, color conversion of an image, and red-eye correction may be performed in accordance with the operation by the user.

In step 601, the CPU 111 determines whether or not the printing execution operation equivalent to step 506 of FIG. 5 is performed by the user. When it is determined that the printing execution operation is performed, the CPU 111 determines in step 602 whether or not the sheet type set on the print setting screen 901 illustrated in FIG. 9 is "disc". When it is determined in step 602 that the sheet type is "disc", the processing proceeds to step 603.

In step 603, the CPU 111 determines whether or not the white mask processing is executed with respect to the image in the image file selected in step 600 as the creation processing for the image in accordance with the shape of the disc medium.

A configuration may be adopted in which, even when the white mask processing can be performed in the terminal apparatus 110, the white mask processing is not performed under a predetermined condition. In this case, it is determined in step 603 that the white mask processing is not performed. The above-described predetermined condition may include a setting by the user. For example, in a case where the terminal apparatus 110 is in a predetermined busy state, the white mask processing may be avoided. Alternatively, the white mask processing may be performed in a case where a resolution of the image is higher than or equal to a predetermined resolution. In contrast, the white mask processing may be performed in a case where the resolution of the image is lower than or equal to a predetermined resolution. When it is determined in step 603 that the white mask processing is performed, the processing proceeds to step 604.

In step 604, the CPU 111 performs the white mask processing in accordance with the shape of the disc medium with respect to the image of the printing target. It should be noted that the shape of the disc medium can be adjusted by the user in the printing application for executing the processing of FIG. 6A, and the white mask processing in accordance with the already adjusted shape of the disc medium is performed in step 604.

In step 604, when the white mask processing is performed, the CPU 111 adds white mask processing completion information indicating that the white mask processing is performed on the image to the print job in step 605. For example, the white mask processing completion information is added to the image file of the printing target. Specifically, the CPU 111 records the white mask processing completion information in a segment starting from an APP1 marker included in a JPEG file of the printing target. More specifically, the white mask processing completion information is recorded in MakerNote in EXIT information in the segment. In addition, for example, whether or not the white mask processing is performed may be recorded by recording data of either True or False. The CPU 111 records True in a case where the white mask processing is performed. On the other hand, in a case where it is determined in S603 that the white mask processing is not performed, the CPU 111 records False. To add the white mask processing completion information, a configuration may be adopted in which the CPU 111 adds the APP1 segment to the JPEG file by the printing application.

In step 605, when the white mask processing completion information is added to the print job, the processing proceeds to step 606. In a case where it is determined in S602 that the sheet type in the print setting is not "disc" or determined in step 603 that the white mask processing is not performed, the processing proceeds to step 606.

In step 606, the CPU 111 transmits the print setting set on the print setting screen 901 illustrated in FIG. 9 and the print job including the image of the printing target to the printing apparatus 120.

It should be noted that, in a case where the printing application of the terminal apparatus 110 does not execute the white mask processing, the processing in steps 602 to 605 in FIG. 6A is not performed. For this reason, the white mask processing completion information is not added to the print job generated by the terminal apparatus.

FIG. 6B illustrates the processing executed by the CPU 121 of the printing apparatus 120.

In step 610, the CPU 121 determines whether or not the print job is received. When the print job is received, the processing proceeds to step 611.

In step 611, the CPU 121 analyzes the received print job. Specifically, the print settings in the print job (such as the sheet size and the sheet type) and the APP1 marker of the JPEG file corresponding to the image of the printing target are analyzed.

In step 612, the CPU 121 determines whether or not "disc" is set as the sheet type as a result of the analysis of the print job. When it is determined that "disc" is set as the sheet type, the CPU 121 determines in step 613 whether or not the sheet size in the print setting is "12 cm×12 cm". In a case where the size is not "12 cm×12 cm", since there is a possibility that the user selects the sheet type "disc" but a sheet size largely different from the size of the disc medium is selected, the processing is ended without performing the printing. At this time, an error display may be performed on the display unit 116. In step 613, when it is determined that the sheet size in the print setting is "12 cm×12 cm", the processing proceeds to step 614.

In step 614, the CPU 121 determines whether or not the APP1 marker of the JPEG file includes the white mask processing completion information on the basis of the analysis of the print job in step 611. With this determination, it is determined whether or not the white mask processing is performed on the image of the printing target. For example, in a case where the white mask processing completion information exists, it is determined that the white mask processing is executed. In addition, as described above, the terminal apparatus 110 may record either True or False as the white mask processing completion information. In this case, in step 614, the CPU 121 determines that the white mask processing is executed when the white mask processing completion information is recorded and also indicates True.

In step 614, when it is determined that the white mask processing is not executed with respect to the image of the printing target, the processing proceeds to step 615.

In step 615, the CPU 121 executes the white mask processing in accordance with the shape of the disc medium with respect to the image of the printing target. The processing herein is similar to the white mask processing by the terminal apparatus 110 in step 604. It should be noted that the ROM 122 of the printing apparatus 120 previously stores information indicating the shape of the disc medium, and the white mask processing is performed on the basis of the disc medium information indicated by the information in the processing in step 615.

In a case where it is determined in step 615 that the white mask processing is executed or it is determined in step 612 that the sheet type is not "disc", the processing proceeds to step 616.

In step 616, the CPU 121 executes the printing of the image of the printing target by the printing unit 125 in accordance with the print setting indicated by the setting information in the print job. It should be noted that the CPU 121 causes the disc medium conveyance unit 127 to execute the conveyance of the disc medium in a case where the sheet feeding port in the print setting is "disc" and causes the sheet feeding unit 126 to execute the conveyance of the sheet in a case where the sheet feeding port is "ASF".

In step 616, the CPU 121 performs the same-size printing corresponding to the method of performing the printing without carrying out the automatic magnification/reduction for the image of the printing target. For this reason, in a case where it is determined in step 612 that the sheet type is not "disc", the CPU 121 may determine whether or not the sheet size in the print setting and the sheet size of the sheet information registered in step 207 of FIG. 2 are matched with each other. Then, in a case where it is determined that the sizes are matched with each other, the CPU 121 executes the printing. On the other hand, in a case where it is determined that the sizes are not matched with each other, the CPU 121 does not execute the printing and may perform an error display on the display unit 131.

Second Exemplary Embodiment

According to the first exemplary embodiment, the CPU 121 of the printing apparatus 120 determines whether or not the white mask processing is executed on the image of the printing target depending on whether or not the white mask processing completion information is received from the terminal apparatus 110.

According to a second exemplary embodiment, it is determined whether or not the white mask processing is executed on the image by analyzing the image of the printing target in addition to the above-described determination method.

Figure 7:
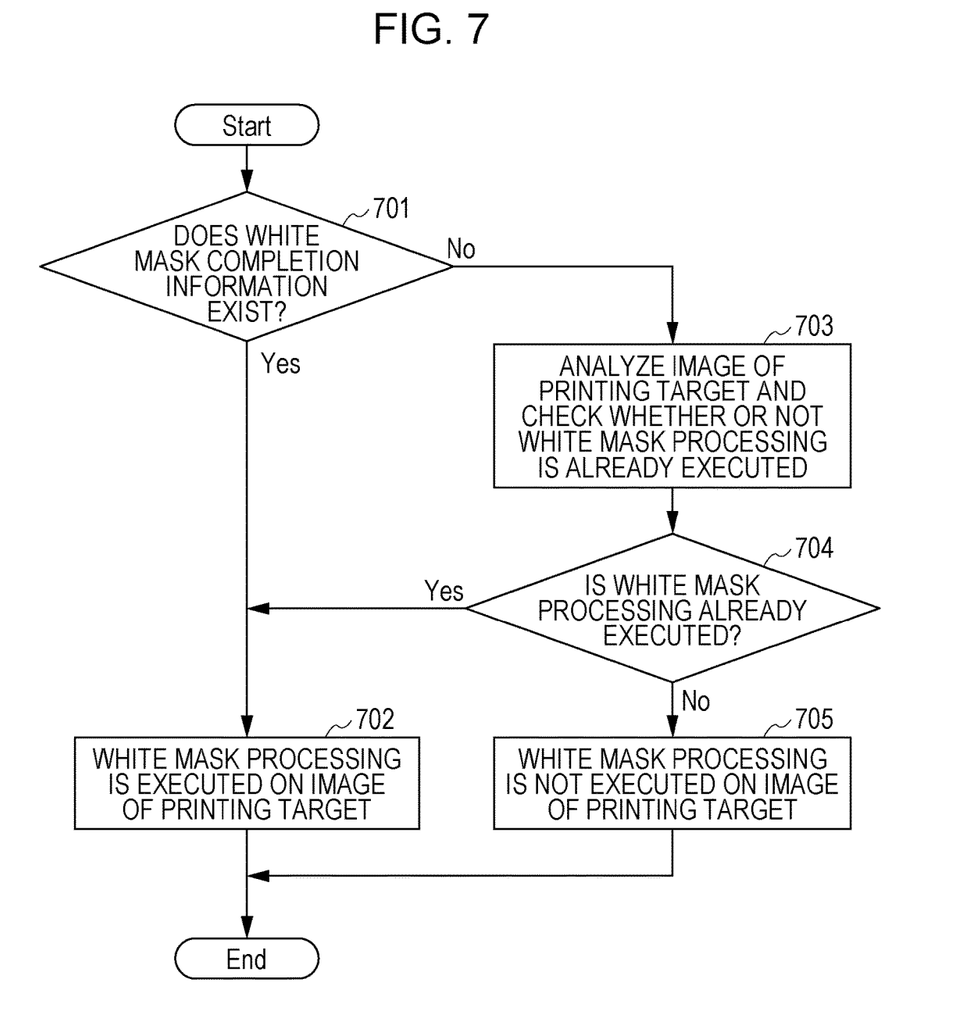
FIG. 7 is a flow chart illustrating determination processing of determining whether or not white mask processing is executed with respect to a printing image according to a second exemplary embodiment.

FIG. 7 is a flow chart illustrating determination processing of determining whether or not the white mask processing is executed with respect to the printing image according to the second exemplary embodiment. It should be noted that the flow chart illustrated in FIG. 7 corresponds to step 614 of FIG. 6B and is executed by the CPU 121 of the printing apparatus 120 similarly as in the processing illustrated in FIG. 6B.

In step 701, the CPU 121 determines whether or not the white mask processing completion information exists (being added to the image of the printing target) similarly as in step 614 described above according to the first exemplary embodiment. The white mask processing completion information is recoded in the segment starting from the APP1 marker in the JPEG file of the printing target similarly as in the first exemplary embodiment. Specifically, the white mask processing completion information is recoded in MakerNote in the EXIT information in the segment. Furthermore, similarly as in the first exemplary embodiment, the white mask processing completion information may be data of either True or False indicating whether or not the white mask processing has been already performed with respect to the image. In this case, in step 701, in a case where the white mask processing completion information is True, it is determined that the white mask processing is performed.

In a case where it is determined in step 701 that the white mask processing completion information exists, the processing proceeds to step 702, and the CPU 121 determines that the white mask processing is executed on the image of the printing target. It is determined whether or not the white mask processing is executed on the image of the printing target by performing the processing in step 701 and step 702 and also step 705 which will be described below as step 614 of FIG. 6B according to the first exemplary embodiment.

According to the second exemplary embodiment, in a case where it is determined in step 701 that the white mask processing completion information does not exist (not being added to the image of the printing target), the processing proceeds to step 703.

In step 703, the CPU 121 analyzes the image of the printing target to check whether or not the white mask processing has been already performed. Specifically, the CPU 121 develops the image data included in the print job and performs image analysis to check whether or not the white mask processing is previously executed in accordance with the disc medium. As a method for the image analysis, for example, the CPU 121 specifies a circular area corresponding to a disc inner diameter in the image data of the printing target. In the example illustrated in FIG. 8, the circular area is an area corresponding to an inner circle having the inner radius 804. The disc inner diameter herein is, for example, a minimum size among a plurality of set sizes. Then, the CPU 121 obtains a luminance value of each pixel in the specified circular area and checks whether or not the pixel having the luminance value lower than or equal to a predetermined threshold exists in the circular area. The above-described predetermined threshold is set as 255 in the case of an 8-bit processing system.

In step 704, the CPU 121 analyzes whether or not the white mask processing is executed on the image of the printing target on the basis of the analysis result in step 703. Specifically, when the pixel having the luminance value lower than or equal to the above-described predetermined threshold does not exist in the above-described circular area by the analysis in step 703, the processing proceeds to step 702, and the CPU 121 determines that the white mask processing is performed on the image of the printing target. When the pixel having the luminance value lower than or equal to the above-described predetermined threshold exits in the above-described circular area, the processing proceeds to step 705, and the CPU 121 determines that the white mask processing is not performed on the image of the printing target.

Even when the white mask processing completion information is not added irrespective of a state in which the white mask processing is actually previously executed with respect to the image of the printing target by the processing illustrated in FIG. 7, it is possible to appropriately determine that the white mask processing has been already executed by the processing in steps 703 and 704. For example, it is assumed that the printing application operating in the terminal apparatus that transmits the image of the printing target to the printing apparatus 120 is application that can perform the white mask processing but does not add the white mask processing completion information. In this case too, according to the second exemplary embodiment, the image of the printing target can appropriately determine that the white mask processing has been already executed.

As described above, in the processing in FIG. 7, the determination processing of checking the presence of the white mask processing completion information in step 701 and the determination processing of analyzing the image in steps 703 and 704 coexist. Only the latter determination processing based on the image analysis can be performed without carrying out the former determination processing based on the white mask processing completion information. It should be noted however that, when processing times of both the determination processings are compared with each other, the determination processing based on the former white mask processing completion information often has a shorter processing time. For this reason, in a case where the white mask processing completion information is added to the image, as compared with a case where only the latter determination processing based on the image analysis is performed, it is possible to determine that the white mask processing has been already executed in a shorter period of processing time.

As described above, according to the first and second exemplary embodiments, even when the terminal apparatus 110 is not provided with the function of creating the image for the printing on the disc medium and transmits the rectangular image, for example, only the above-described disc medium area can be printed in the printing apparatus 120. For this reason, it is possible to avoid the printing that runs out from the disc medium. Thus, for example, it is possible to avoid the contamination of the tray of the disc medium with ink while the printing that runs out from the disc medium is performed.

Furthermore, according to the present exemplary embodiment, the information with which it is possible to determine whether or not the processing in accordance with the disc medium with respect to the image is performed is transmitted from the terminal apparatus 110 together with the image of the printing target. Then, in a case where it is determined that the processing in accordance with the disc medium with respect to the image is not performed by the terminal apparatus 110, the printing apparatus 120 performs the predetermined processing (such as the white mask processing) for printing only the disc medium area to carry out the printing. On the other hand, in a case where it is determined that the processing in accordance with the disc medium with respect to the image is performed by the terminal apparatus 110, the printing is performed without carrying out the above-described predetermined processing.

For this reason, it is possible to avoid the decrease in the printing speed while both the printing apparatus 120 and the terminal apparatus 110 redundantly perform the image processing such as the white mask processing that takes into account the shape of the disc medium. In addition, in a case where the shapes and the sizes of the disc media are different in the printing apparatus 120 and the terminal apparatus 110, it is possible to avoid the printing of the area different from the area supposed by the user while both the printing apparatus 120 and the terminal apparatus 110 redundantly perform the image processing such as the white mask processing. For example, it is possible to avoid a situation where the printing range checked by the user by the printing application drops out as a result.

It should be noted that the disc medium has been described above as an example of the medium on which the printing is performed but is not limited to this. For example, the exemplary embodiments can be applied to a case where the printing is performed on media having various shapes and sizes such as the printing sheet, a card, and a smart phone case. For example, in a case where the medium on which the printing is performed is the card, according to the above-described exemplary embodiments, when the white mask processing in accordance with a card shape is performed in the printing application, it is possible to avoid a situation where the white mask processing is redundantly performed by the printing apparatus.

In addition, according to the above-described exemplary embodiments, the example in which the white mask processing is performed with respect to the image of the printing target has been described as the processing of creating the image having the medium shape but is not limited to this. For example, in the case of the disc medium, processing of performing trimming in accordance with the shape of the disc medium may be performed.

It should be noted that the functions of the above-described exemplary embodiments can be also realized by the following configuration. That is, the functions can also be realized while a program code for performing the processing according to the present exemplary embodiment is supplied to a system or an apparatus, and a computer (or a CPU or an MPU) of the system or the apparatus executes the program code. In this case, the program code itself read out from the storage medium realizes the functions of the above-described exemplary embodiments, and the storage medium that stores the program code also realizes the functions of the above-described exemplary embodiments.

In addition, the configuration may be applied to a case where the program code for realizing the functions of the above-described exemplary embodiments is executed by the single computer (or the CPU or the MPU) or a case where the program code is executed by a plurality of computers in cooperation with one another. Furthermore, the configuration may be applied to a case where the program code is executed by the computer, or hardware such as a circuit or the like configured to realize the functions of the program code may be provided. Alternatively, the configuration may be applied to a case where part of the program code is realized by the hardware, and the remaining part of the program code is realized by the computer.

According to the exemplary embodiments of the present invention, the processing in accordance with the shape of the medium can be performed with respect to the image of the printing target in an appropriate occasion.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-091440, filed Apr. 28, 2016, which is hereby incorporated by reference herein in its entirety.

What is claimed is:

1. A printing apparatus that can print an image of a printing target on a medium having a predetermined shape, the printing apparatus comprising at least one processor, the at least one processor control:
    a determination unit configured to determine whether or not predetermined processing in accordance with the predetermined shape is executed on the image of the printing target;
    an execution unit configured to execute the predetermined processing on the image of the printing target in a case where the determination unit determines that the predetermined processing is not executed on the image of the printing target; and
    a printing unit configured to print the image of the printing target on which the predetermined processing is executed by the execution unit on the medium having the predetermined shape,
    wherein, in a case where the determination unit determines that the predetermined processing is executed on the image of the printing target, the printing unit prints the image of the printing target in which the determination unit determines that the predetermined processing is executed and also on which the predetermined processing is not executed by the execution unit.

2. The printing apparatus according to claim 1, the at least one processor further control:
    a reception unit configured to receive the image of the printing target from an information processing apparatus,
    wherein the determination unit determines whether or not the predetermined processing is executed by determining whether or not predetermined information indicating that the predetermined processing is executed on the image of the printing target is added.

3. The printing apparatus according to claim 2, wherein the image of the printing target is a JPEG file, and the determination unit determines whether or not EXIF information of the JPEG file includes the predetermined information.

4. The printing apparatus according to claim 1, wherein the predetermined processing is mask processing of rewriting a pixel value corresponding to an area where the printing is not performed in the image of the printing target to a predetermined pixel value indicating that the printing is not performed by the printing unit.

5. The printing apparatus according to claim 4, wherein the predetermined pixel value is a pixel value equivalent to white.

6. The printing apparatus according to claim 4, wherein the determination unit analyzes the pixel value corresponding to the area where the printing is not performed in the image of the printing target to determine whether or not the predetermined processing is executed on the image of the printing target.

7. The printing apparatus according to claim 1, wherein the medium having the predetermined shape is a disc medium having a disc shape.

8. A printing system comprising:
    a printing apparatus that can print an image of a printing target on a medium having a predetermined shape and comprising at least one processor; and
    an information processing apparatus that transmits the image of the printing target and comprising at least one processor,
    the at least one processor of the information processing apparatus control
    a transmission unit configured to transmit, in a case where predetermined processing in accordance with the predetermined shape is executed on the image of the printing target, the image of the printing target and predetermined information indicating that the predetermined processing is executed to the printing apparatus, and the at least one processor of the printing apparatus control
a reception unit configured to receive the image of the printing target,
a determination unit configured to determine whether or not the predetermined processing is executed on the image of the printing target received by the reception unit on a basis of whether or not the predetermined information transmitted by the transmission unit is received by the reception unit,
an execution unit configured to execute the predetermined processing on the image of the printing target in a case where the determination unit determines that the predetermined processing is not executed on the image of the printing target, and
a printing unit configured to print the image of the printing target on which the predetermined processing is executed by the execution unit on the medium having the predetermined shape,
wherein, in a case where the determination unit determines that the predetermined processing is executed on the image of the printing target, the printing unit prints the image of the printing target in which the determination unit determines that the predetermined processing is executed and also on which the predetermined processing is not executed by the execution unit.

9. The printing system according to claim 8, wherein the predetermined processing is mask processing of rewriting a pixel value corresponding to an area where the printing is not performed in the image of the printing target to a predetermined pixel value indicating that the printing is not performed by the printing unit.

10. The printing system according to claim 9, wherein the predetermined pixel value is a pixel value equivalent to white.

11. The printing system according to claim 8, wherein the medium having the predetermined shape is a disc medium having a disc shape.

12. A printing method of printing an image of a printing target on a medium having a predetermined shape, the printing method comprising:
determining whether or not predetermined processing in accordance with the predetermined shape is executed on the image of the printing target;
executing the predetermined processing on the image of the printing target in a case where it is determined in the determining that the predetermined processing is not executed on the image of the printing target; and
printing the image of the printing target on which the predetermined processing is executed in the executing on the medium having the predetermined shape,
wherein, in a case where it is determined in the determining that the predetermined processing is executed on the image of the printing target, the image of the printing target in which it is determined in the determining that the predetermined processing is executed and also on which the predetermined processing is not executed in the executing is printed in the printing.

13. The printing method according to claim 12, wherein the predetermined processing is mask processing of rewriting a pixel value corresponding to an area where the printing is not performed in the image of the printing target to a predetermined pixel value indicating that the printing is not performed in the printing.

14. The printing method according to claim 13, wherein the predetermined pixel value is a pixel value equivalent to white.

15. The printing method according to claim 12, wherein the medium having the predetermined shape is a disc medium having a disc shape.

* * * * *